United States Patent
Li

(10) Patent No.: US 12,483,947 B2
(45) Date of Patent: Nov. 25, 2025

(54) COMMUNICATION METHOD AND APPARATUS

(71) Applicant: GUANGDONG OPPO MOBILE TELECOMMUNICATIONS CORP., LTD., Guangdong (CN)

(72) Inventor: Haitao Li, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 555 days.

(21) Appl. No.: 17/893,103

(22) Filed: Aug. 22, 2022

(65) Prior Publication Data
US 2023/0171654 A1    Jun. 1, 2023

Related U.S. Application Data

(63) Continuation of application No. PCT/CN2020/076664, filed on Feb. 25, 2020.

(51) Int. Cl.
*H04W 74/0808* (2024.01)
*H04W 36/00* (2009.01)
*H04W 36/08* (2009.01)

(52) U.S. Cl.
CPC ... *H04W 36/0077* (2013.01); *H04W 36/0058* (2018.08); *H04W 36/0072* (2013.01); *H04W 74/0808* (2013.01); *H04W 36/08* (2013.01)

(58) Field of Classification Search
CPC ......... H04W 36/0077; H04W 36/0058; H04W 36/0072; H04W 74/0808; H04W 36/08; H04W 36/0094
See application file for complete search history.

(56) References Cited

U.S. PATENT DOCUMENTS

| | | | |
|---|---|---|---|
| 9,107,134 B1* | 8/2015 | Belser | H04W 52/281 |
| 10,638,287 B2* | 4/2020 | Thubert | H04W 48/18 |

(Continued)

FOREIGN PATENT DOCUMENTS

| | | |
|---|---|---|
| CN | 103081555 A | 5/2013 |
| CN | 103686913 A | 3/2014 |

(Continued)

OTHER PUBLICATIONS

Huawei, HiSilicon, "Enhancements to RACH-less solution," R2-1907678, (revision of R2-1904951), 3GPP TSG-RAN WG2 Meeting # 106, Reno, Nevada, USA, May 13-17, 2019.

(Continued)

*Primary Examiner* — Atique Ahmed
(74) *Attorney, Agent, or Firm* — Ladas & Parry, LLP

(57) ABSTRACT

The present disclosure provides a communication method and apparatus, the method includes: sending, by a first network device, a handover request to a second network device, where the handover request is used for handing over a target network device that serves a terminal device from the first network device to a second network device, and the handover request includes a TA of the terminal device with the second network device, or includes location information of the terminal device and a movement trajectory of the terminal device for determining the TA of the terminal device with the second network device. In this way, as the second network device after handover has determined the timing advance TA of the terminal device with the second network device, an uplink transmission time indicated by the network device can be prevented from being before a downlink reception time, ensuring usability of uplink resource configuration.

7 Claims, 7 Drawing Sheets

(56) References Cited

U.S. PATENT DOCUMENTS

| | | | |
|---|---|---|---|
| 10,757,624 B2* | 8/2020 | Jin | H04W 24/10 |
| 2015/0156743 A1* | 6/2015 | Lee | H04W 76/14 |
| | | | 455/426.1 |
| 2016/0323800 A1* | 11/2016 | Ulupinar | H04B 7/1851 |
| 2018/0020472 A1 | 1/2018 | Lin et al. | |
| 2018/0184246 A1* | 6/2018 | Ryu | H04W 68/06 |
| 2018/0332507 A1* | 11/2018 | Fujishiro | H04W 36/00692 |
| 2019/0306768 A1* | 10/2019 | Kim | H04W 36/302 |
| 2020/0344651 A1* | 10/2020 | Yang | H04W 36/0022 |
| 2023/0102946 A1* | 3/2023 | Wang | H04W 74/0833 |
| | | | 370/329 |

FOREIGN PATENT DOCUMENTS

| | | |
|---|---|---|
| CN | 107872856 A | 4/2018 |
| CN | 104641685 B | 5/2019 |
| CN | 109819490 A | 5/2019 |
| CN | 110475306 A | 11/2019 |
| CN | 110574488 A | 12/2019 |
| EP | 3419337 A1 * 12/2018 | ............ H04W 36/02 |
| WO | 2021168665 A1 | 9/2021 |

OTHER PUBLICATIONS

The Extended European Search Report of corresponding European application No. 20921433.7, dated Mar. 14, 2023.
International Search Report (ISR) dated Nov. 9, 2020 for Application No. PCT/CN2020/076664, and its English Translation provided by WIPO.
Written Opinion (WOSA) dated Nov. 9, 2020 for Application No. PCT/CN2020/076664, and tis English Translation provided by Google Translate.
MediaTek Inc.:"Synchronized Handover without Random Access in LEO NTN," 3GPP TSG-RAN WG2 Meeting #108 Tdoc, R2-1914588, Nov. 18, 2019, all pages.

* cited by examiner

COMMUNICATION METHOD AND APPARATUS

CROSS-REFERENCE TO RELATED APPLICATIONS

This application is a continuation of International Application No. PCT/CN2020/076664, filed on Feb. 25, 2020, the content of which is incorporated herein by reference in its entirety.

TECHNICAL FIELD

The present disclosure relates to communication technology, and in particular, to a communication method and apparatus.

BACKGROUND

Non terrestrial network (NTN) technology generally adopts satellite communication to provide communication services to terrestrial users. Compared with terrestrial cellular network communication, satellite communication has the characteristics of not being restricted by user region, long communication distance and high stability. Moreover, satellite communication has great social value, which is conducive to narrowing the digital divide between underdeveloped and developed regions and promoting the development of these regions.

In related technologies, in long term evolution (LTE) and traditional new radio (NR) terrestrial cellular networks, a target cell may configure random access channel (RACH) information in a handover command. The RACH information may include an uplink resource for a terminal device to access the target cell which is provided for the terminal device to send a handover completion message. Alternatively, if the uplink resource is not configured in the handover command, the terminal device may monitor a physical downlink control channel (PDCCH) of the target cell and wait for the target cell to schedule uplink transmission.

However, in an NTN system, due to large coverage of satellites, wireless signal transmission delay between different terminal devices and a satellite in a same cell is quite different, and wireless signal transmission delay between a same terminal device and different satellites is also quite different. If a target base station schedules the uplink transmission of the terminal device based on a delay value less than real round-trip delay of the channel transmission between the terminal device and the base station, it is possible to cause an uplink resource scheduled by the PDCCH to be before the actual reception time of the PDCCH and thus to be missed by the terminal device.

If the target base station schedules the uplink transmission of the terminal device based on a maximum round-trip delay within the cell coverage, uplink transmission delay may increase due to the allocated uplink resource delay which is too large, thereby increasing handover delay. Therefore, in the NTN system, if an uplink transmission time indicated by a network device is before a downlink reception time, it is possible to cause that uplink resource configuration cannot be used.

SUMMARY

Embodiments of the present disclosure provides a communication method and apparatus, so as to solve the problem that uplink resource configuration in an NTN system in the prior art cannot be used.

A first aspect of the present disclosure provides a communication method, including:
sending, by a first network device, a handover request to a second network device, where the handover request is used for handing over a terminal device from the first network device to the second network device, and the handover request includes a TA of the terminal device with the second network device.

In an implementation, the method further includes:
sending, by the first network device, measurement information to the terminal device, where the measurement information is used for requesting the terminal device to perform TA measurement; and
receiving, by the first network device, a measurement report sent by the terminal device, where the measurement report includes the TA of the terminal device with the second network device.

In an implementation, the method further includes:
sending, by the first network device, activation information to the terminal device, where the activation information is used for activating the terminal device to perform the TA measurement according to the measurement information and generate the measurement report of the terminal device.

In an implementation, the method further includes:
determining, by the first network device, the second network device to which to hand over the terminal device according to the measurement report of the terminal device.

In an implementation, the method further includes:
receiving, by the first network device, a handover confirmation response sent by the second network device, where the handover confirmation response includes a handover instruction, and the handover instruction is used for indicating that the terminal device is to be handed over from the first network device to the second network device; and
sending, by the first network device, the handover instruction to the terminal device.

In an implementation, the handover instruction includes an uplink resource for the terminal device.

A second aspect of the present disclosure provides a communication method, including:
receiving, by a second network device, a handover request sent by a first network device, where the handover request is used for handing over a terminal device from the first network device to the second network device, and the handover request includes a TA of the terminal device with the second network device; and
scheduling, by the second network device, an uplink resource for the terminal device according to the TA of the terminal device with the second network device.

In an implementation, the method further includes:
sending, by the second network device, a handover confirmation response to the first network device, where the handover confirmation response includes a handover instruction, and the handover instruction is used for indicating that the terminal device is to be handed over from the first network device to the second network device.

In an implementation, the handover instruction includes an uplink resource for the terminal device.

In an implementation, the method further includes:
indicating, by the second network device, the uplink resource for the terminal device to the terminal device by a physical downlink control channel.

A third aspect of the present disclosure provides a communication method, including:

receiving, by a terminal device, a handover instruction sent by a first network device, where the handover instruction is used for indicating that the terminal device is to be handed over from the first network device to a second network device.

In an implementation, the method further includes:

receiving, by the terminal device, measurement information sent by the first network device; and performing, by the terminal device, TA measurement according to the measurement information and generating a measurement report of the terminal device; where the measurement report includes a TA of the terminal device with the second network device.

In an implementation, the method further includes:

receiving, by the terminal device, activation information sent by the first network device, where the activation information is used for activating the terminal device to perform the TA measurement according to the measurement information and generate the measurement report of the terminal device.

In an implementation, the method further includes:

reporting, by the terminal device, the measurement report of the terminal device according to a measurement reporting condition in the measurement information.

In an implementation, the handover instruction includes an uplink resource for the terminal device.

In an implementation, the method further includes:

monitoring, by the terminal device, a physical downlink control channel of the second network device and receiving an uplink resource for the terminal device indicated by the second network device.

A fourth aspect of the present disclosure provides a communication method, including:

sending, by a first network device, a handover request to a second network device, where the handover request is used for handing over a terminal device from the first network device to the second network device, and the handover request includes location information of the terminal device and a movement trajectory of the terminal device, and the location information of the terminal device and the movement trajectory of the terminal device are used for determining a TA of the terminal device and with second network device.

In an implementation, the method further includes:

sending, by the first network device, measurement information to the terminal device, where the measurement information is used for requesting the terminal device to measure the location information of the terminal device and the movement trajectory of the terminal device; and receiving, by the first network device, a measurement report sent by the terminal device, where the measurement report includes the location information of the terminal device and the movement trajectory of the terminal device.

In an implementation, the location information includes a timestamp of when the terminal device is at the location.

In an implementation, the movement trajectory includes a movement direction of the terminal device, a movement speed of the terminal device and an acceleration of the terminal device.

In an implementation, the method further includes:

determining, by the first network device, the second network device to which to hand over the terminal device according to the measurement report of the terminal device.

In an implementation, the method further includes:

receiving, by the first network device, a handover confirmation response sent by the second network device, where the handover confirmation response includes a handover instruction, and the handover instruction is used for indicating that the terminal device is to be handed over from the first network device to the second network device; and sending, by the first network device, the handover instruction to the terminal device.

In an implementation, the handover instruction includes an uplink resource for the terminal device.

A fifth aspect of the present disclosure provides a communication method, including:

receiving, by a second network device, a handover request sent by a first network device, where the handover request is used for handing over a terminal device from the first network device to the second network device, and the handover request includes location information of the terminal device and a movement trajectory of the terminal device;

determining, by the second network device, a TA of the terminal device with the second network device according to the location information of the terminal device and the movement trajectory of the terminal device; and scheduling, by the second network device, an uplink resource for the terminal device according to the TA of the terminal device with the second network device.

In an implementation, the location information includes a timestamp of when the terminal device is at a location.

In an implementation, the movement trajectory includes a movement direction of the terminal device, a movement speed of the terminal device and an acceleration of the terminal device.

In an implementation, the method further includes:

sending, by the second network device, a handover confirmation response to the first network device, where the handover confirmation response includes a handover instruction, and the handover instruction is used for indicating that the terminal device is to be handed over from the first network device to the second network device.

In an implementation, the handover instruction includes the uplink resource for the terminal device.

In an implementation, the method further includes:

indicating, by the second network device, the uplink resource for the terminal device to the terminal device by a physical downlink control channel.

A sixth aspect of the present disclosure provides a communication method, including:

receiving, by a terminal device, a handover instruction sent by a first network device, where the handover instruction is used for indicating that the terminal device is to be handed over from the first network device to a second network device.

In an implementation, the method further includes:

receiving, by the terminal device, measurement information sent by the first network device; and measuring, by the terminal device, location information of the terminal device and a movement trajectory of the terminal device according to the measurement information, and generating a measurement report of the terminal device.

In an implementation, the location information includes a timestamp of when the terminal device is at a location.

In an implementation, the movement trajectory includes a movement direction of the terminal device, a movement speed of the terminal device and an acceleration of the terminal device.

In an implementation, the method further includes:
reporting, by the terminal device, the measurement report of the terminal device according to a measurement reporting condition in the measurement information.

In an implementation, the handover instruction includes an uplink resource for the terminal device.

In an implementation, the method further includes:
monitoring, by the terminal device, a physical downlink control channel of the second network device and receiving an uplink resource for the terminal device indicated by the second network device.

A seventh aspect of the present disclosure provides a communication apparatus, including:
a sending module, configured to send a handover request to a second network device, where the handover request is used for handing over a terminal device from the communication apparatus to the second network device, and the handover request includes a TA of the terminal device with the second network device.

In an implementation, the apparatus further includes: a receiving module;
the sending module is further configured to send measurement information to the terminal device, where the measurement information is used for requesting the terminal device to perform TA measurement; and
the receiving module is configured to receive a measurement report sent by the terminal device, where the measurement report includes the TA of the terminal device with the second network device.

In an implementation, the sending module is further configured to send activation information to the terminal device, where the activation information is used for activating the terminal device to perform the TA measurement according to the measurement information and generate the measurement report of the terminal device.

In an implementation, the apparatus further includes: a processing module, configured to determine the second network device to which to hand over the terminal device according to the measurement report of the terminal device.

In an implementation, the receiving module is further configured to receive a handover confirmation response sent by the second network device, where the handover confirmation response includes a handover instruction, and the handover instruction is used for indicating that the terminal device is to be handed over from the communication apparatus to the second network device; and
the sending module is further configured to send the handover instruction to the terminal device.

In an implementation, the handover instruction includes an uplink resource for the terminal device.

An eighth aspect of the present disclosure provides a communication apparatus, including:
a receiving module, configured to receive a handover request sent by a first network device, where the handover request is used for handing over a terminal device from the first network device to the communication apparatus, and the handover request includes a TA of the terminal device with the communication apparatus;
a processing module, configured to schedule an uplink resource for the terminal device according to the TA of the terminal device with the communication apparatus.

In an implementation, the apparatus further includes: a sending module, configured to send a handover confirmation response to the first network device, where the handover confirmation response includes a handover instruction, and the handover instruction is used for indicating that the terminal device is to be handed over from the first network device to the communication apparatus.

In an implementation, the handover instruction includes the uplink resource for the terminal device.

In an implementation, the sending module is further configured to indicate the uplink resource for the terminal device to the terminal device by a physical downlink control channel.

A ninth aspect of the present disclosure provides a communication apparatus, including:
a receiving module, configured to receive a handover instruction sent by a first network device, where the handover instruction is used for indicating that the communication apparatus to be handed over from the first network device to a second network device.

In an implementation, the apparatus further includes: a processing module;
the receiving module is further configured to receive measurement information sent by the first network device; and
the processing module is further configured to perform TA measurement according to the measurement information and generate a measurement report of the communication apparatus; where the measurement report includes a TA of the communication apparatus and with second network device.

In an implementation, the receiving module is further configured to receive activation information sent by the first network device, where the activation information is used for activating the communication apparatus to perform the TA measurement according to the measurement information and generate the measurement report of the communication apparatus.

In an implementation, the apparatus further includes: a sending module, configured to report the measurement report of the communication apparatus according to a measurement reporting condition in the measurement information.

In an implementation, the handover instruction includes an uplink resource for the communication apparatus.

In an implementation, the receiving module is further configured to monitor a physical downlink control channel of the second network device and receive an uplink resource for the communication apparatus indicated by the second network device.

A tenth aspect of the present disclosure provides a communication apparatus, including:
a sending module, configured to send a handover request to a second network device, where the handover request is used for handing over a terminal device from the communication apparatus to the second network device, and the handover request includes location information of the terminal device and a movement trajectory of the terminal device, and the location information of the terminal device and the movement trajectory of the terminal device are used for determining a TA of the terminal device with the second network device.

In an implementation, the apparatus further includes: a receiving module;

the sending module is further configured to send measurement information to the terminal device, where the measurement information is used for requesting the terminal device to measure the location information of the terminal device and the movement trajectory of the terminal device; and the receiving module is configured to receive a measurement report sent by the terminal device, where the measurement report includes the location information of the terminal device and the movement trajectory of the terminal device.

In an implementation, the location information includes a timestamp of when the terminal device is at a location.

In an implementation, the movement trajectory includes a movement direction of the terminal device, a movement speed of the terminal device and an acceleration of the terminal device.

In an implementation, the apparatus further includes: a processing module; and the processing module is configured to determine the second network device to which to hand over the terminal device according to the measurement report of the terminal device.

In an implementation, the receiving module is further configured to receive a handover confirmation response sent by the second network device, where the handover confirmation response includes a handover instruction, and the handover instruction is used for indicating that the terminal device is to be handed over from the communication apparatus to the second network device; and the sending module is further configured to send the handover instruction to the terminal device.

In an implementation, the handover instruction includes an uplink resource for the terminal device.

An eleventh aspect of the present disclosure provides a communication apparatus, including:

a receiving module, configured to receive a handover request sent by a first network device, where the handover request is used for handing over a terminal device from the first network device to the communication apparatus, and the handover request includes location information of the terminal device and a movement trajectory of the terminal device; and a processing module, configured to determine a TA of the terminal device with the communication apparatus according to the location information of the terminal device and the movement trajectory of the terminal device; and schedule an uplink resource for the terminal device according to the TA of the terminal device with the communication apparatus.

In an implementation, the location information includes a timestamp of when the terminal device is at a location.

In an implementation, the movement trajectory includes a movement direction of the terminal device, a movement speed of the terminal device and an acceleration of the terminal device.

In an implementation, the apparatus further includes:

a sending module, configured to send a handover confirmation response to the first network device, where the handover confirmation response includes a handover instruction, and the handover instruction is used for indicating that the terminal device is to be handed over from the first network device to the communication apparatus.

In an implementation, the handover instruction includes an uplink resource for the terminal device.

In an implementation, the sending module is further configured to indicate an uplink resource for the terminal device to the terminal device by a physical downlink control channel.

A twelfth aspect of the present disclosure provides a communication apparatus, including:

a receiving module, configured to receive a handover instruction sent by a first network device, where the handover instruction is used for indicating that the terminal device is to be handed over from the first network device to a second network device.

In an implementation, the apparatus further includes: a processing module;

the receiving module is further configured to receive measurement information sent by the first network device; and the processing module is configured to measure location information of the terminal device and a movement trajectory of the terminal device according to the measurement information, and generate a measurement report of the terminal device.

In an implementation, the location information includes a timestamp of when the terminal device is at a location.

In an implementation, the movement trajectory includes a movement direction of the terminal device, a movement speed of the terminal device and an acceleration of the terminal device.

In an implementation, the apparatus further includes:

a sending module, configured to report the measurement report of the terminal device according to a measurement reporting condition in the measurement information.

In an implementation, the handover instruction includes an uplink resource for the terminal device.

In an implementation, the receiving module is further configured to monitor a physical downlink control channel of the second network device and receive an uplink resource for the terminal device indicated by the second network device.

A thirteenth aspect of the present disclosure provides a network device, where the network device includes: a processor, a memory, a transmitter and a receiver; the transmitter and the receiver are coupled to the processor, the processor controls a sending action of the transmitter, and the processor controls a receiving action of the receiver;

where the memory is configured to store computer-executable program code, and the program code includes information; when the processor executes the information, the information causes the network device to execute the communication method provided by the implementations of the first aspect, the second aspect, the fourth aspect or the fifth aspect.

A fourteenth aspect of the present disclosure provides a terminal device, where the terminal device includes: a processor, a memory, a transmitter and a receiver; the transmitter and the receiver are coupled to the processor, the processor controls a sending action of the transmitter, and the processor controls a receiving action of the receiver;

where the memory is configured to store computer-executable program code, and the program code includes information; when the processor executes the information, the information causes the terminal device to execute the communication method provided by various possible implementations of the third aspect or the sixth aspect.

A fifteenth aspect of the present disclosure provides a chip, including a processor, configured to call and run a computer program from a memory to cause a device equipped with the chip to execute the communication method as provided by the implementations of the first aspect, the second aspect, the fourth aspect or the fifth aspect.

A sixteenth aspect of the present disclosure provides a chip, including a processor, configured to call and run a computer program from a memory to cause a device equipped with the chip to execute the communication method as provided by the implementations of the third aspect or the sixth aspect.

A seventeenth aspect of the present disclosure provides a computer-readable storage medium, configured to store a computer program, where the computer program causes a computer to execute the communication method as provided by the implementations of the first aspect, the second aspect, the fourth aspect or the fifth aspect.

An eighteenth aspect of the present disclosure provides a computer-readable storage medium, configured to store a computer program, where the computer program causes a computer to execute the communication method as provided by the implementations of the third aspect or the sixth aspect.

A nineteenth aspect of the present disclosure provides a computer program product, including computer program information that causes a computer to execute the communication method as provided by the implementations of the first aspect, the second aspect, the fourth aspect or the fifth aspect.

A twentieth aspect of the present disclosure provides a computer program product, including computer program information that causes a computer to execute the communication method as provided by the implementations of the third aspect or the sixth aspect.

A twenty-first aspect of the present disclosure provides a computer program that causes a computer to execute the communication method as provided by the implementations of the first aspect, the second aspect, the fourth aspect or the fifth aspect.

A twenty-second aspect of the present disclosure provides a computer program that causes a computer to execute the communication method as provided by the implementations of the third aspect or the sixth aspect.

According to the communication method and apparatus provided by the embodiments of the present disclosure, a first network device sends a handover request to a second network device, where the handover request is used for switching a target network device that serves a terminal device from the first network device to the second network device, and the handover request includes a TA of the terminal device with the second network device, or includes location information of the terminal device and a movement trajectory of the terminal device for determining the TA of the terminal device with the second network device. In this way, as the second network device after handover has determined the timing advance TA of the terminal device with the second network device, an uplink transmission time indicated by the network device can be prevented from being before a downlink reception time, ensuring usability of uplink resource configuration.

BRIEF DESCRIPTION OF DRAWINGS

In order to describe the technical solutions in the present disclosure or prior art more clearly, in the following, accompanying drawings that need to be used in the description of the embodiments or prior art will be introduced briefly. Obviously, the drawings described below are some embodiments of the present disclosure, and for those of ordinary skill in the art, other drawings can be obtained based on these accompanying drawings without paying creative effort.

DESCRIPTION OF EMBODIMENTS

Figure 1:
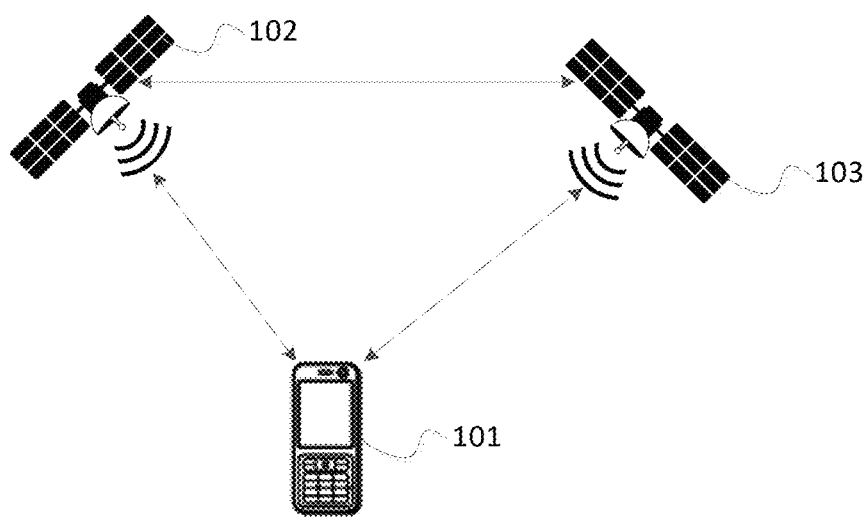
FIG. 1 is a schematic scenario diagram of a communication method according to an embodiment of the present disclosure.

In order to make the purpose, technical solutions and advantages of the present disclosure clearer, the technical solutions in the embodiments of the present disclosure will be described in the following clearly and completely in conjunction with accompanying drawings in the embodiments of the present disclosure. Apparently, the described embodiments are part rather than all of the embodiments of the present disclosure. Based on the embodiments in the present disclosure, all other embodiments obtained by those of ordinary skill in the art without paying creative work shall fall within the protection scope of the present disclosure.

The terms appearing in the present disclosure are first explained below.

Physical downlink control channel (PDCCH) is a set of physical resource elements used for carrying scheduling and other control information.

Timing advance (TA) is a burst pulse sent by a mobile station with a certain advance.

Random access channel (RACH) is a type of uplink transmission channel, which is received in an entire cell, and is often used for paging (PAGING) reply and mobile station (MS) calling or login access.

Non terrestrial network (NTN) technology generally adopts satellite communication to provide communication services to terrestrial users. Compared with terrestrial cellular network communication, satellite communication has the characteristics of not being restricted by user region, long communication distance and high stability. Moreover, satellite communication has great social value, which is conducive to narrowing the digital divide between underdeveloped and developed regions and promoting the development of these regions.

In related technologies, in long term evolution (LTE) and traditional new radio (NR) terrestrial cellular networks, a target cell may configure random access channel (RACH) information in a handover command. The RACH information may include an uplink resource for a terminal device to access the target cell which is provided for the terminal device to send a handover completion message. Alternatively, if uplink resource is not configured in the handover command, the terminal device may monitor a physical downlink control channel (PDCCH) of the target cell and wait for the target cell to schedule uplink transmission.

However, in an NTN system, due to large coverage of satellites, wireless signal transmission delay between different terminal devices and a satellite in a same cell is quite different, and wireless signal transmission delay between a same terminal device and different satellites is also quite different. If a target base station schedules the uplink transmission of the terminal device based on a delay value less than real delay of the channel transmission between the terminal device and the base station, it may cause an uplink resource scheduled by the PDCCH to be before the actual reception time of the PDCCH and thus to be missed by the terminal device. If the target base station schedules the uplink transmission of the terminal device based on a maximum transmission delay within the cell coverage, uplink transmission delay may increase due to allocated uplink resource delay which is too large, thereby increasing handover delay. Therefore, in the NTN system, an uplink transmission time indicated by a network device is before downlink reception time, resulting in that uplink resource configuration cannot be used.

In order to solve the above problem, to guarantee the usability of uplink resource configuration in the NTN system, in the present disclosure, when network devices perform handover, a target network device to which the terminal device is to be handed over can be made aware of a TA of the terminal device with the target network device, and thus an uplink transmission time indicated by the target network device can be prevented from being before a downlink reception time, and usability of uplink resource configuration is guaranteed.

FIG. 1 is a schematic scenario diagram of a communication method according to an embodiment of the present disclosure. As shown in FIG. 1, a terminal device 101, a first network device 102 and a second network device 103 communicate with each other. When the terminal device 101 is handed over from the first network device 102 to the second network device 103, the first network device 102 may send a handover request to the second network device 103, and the handover request may assist the second network device 103 to determine a timing advance TA of the terminal device 101 with the second network device 103.

The terminal device may also be referred to as a terminal, a user equipment (UE), a mobile station (MS), a mobile terminal (MT), and the like. The terminal device 102 may be a mobile phone, a pad, a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in smart grid, a wireless terminal in smart home, etc.

A network device may, for example, be a base station, or various types of wireless access points, or may refer to a device in an access network that communicates with user equipment through one or more sectors on an air interface. The base station may be used to convert received air frames to and from IP packets, acting as a router between a wireless terminal and rest of an access network, the rest of the access network may include an Internet Protocol (IP) network. The base station may also coordinate attribute management of the air interface. For example, the base station may be a base transceiver station (BTS) in a global system of mobile communication (GSM) or code division multiple access (CDMA), may also be a base station (NodeB, NB) in wideband code division multiple Access (WCDMA), may further be an evolutional base station (eNB or eNodeB) in long term evolution (LTE), or a relay station or an access point, or a base station gNB in a future 5G network, etc., which is not limited here. Preferably, the network device may be a satellite in the NTN system.

It should be noted that, the communication methods involved in the embodiments of the present disclosure may be applied to the NTN system, and may also be applied to other communication systems, which are not limited in the implementation of the present disclosure.

It should be noted that the disclosure scenario shown in FIG. 1 is only a scenario where the present disclosure can be applied, and the present disclosure can also be applied to other communication scenarios.

In the following, taking a network device and a terminal device as examples, the technical solutions of the embodiments of the present disclosure will be described in detail with specific embodiments. The following specific embodiments may be combined with each other, and the same or similar concepts or processes may not be repeated in some embodiments.

The present disclosure provides two manners to guarantee the usability of uplink resource configuration. In a first manner, a terminal device has a TA compensation capability, and a first network device sends the second network device a TA of the terminal device with a second network device measured by the terminal device, so as to make an uplink resource configured by the second network device available.

Figure 2:
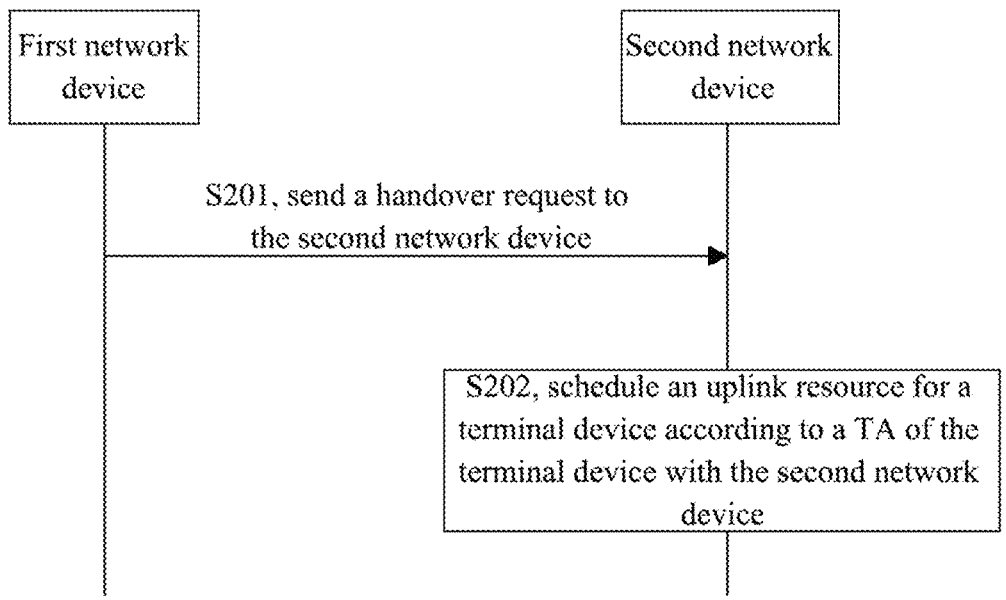
FIG. 2 is a signaling interaction diagram of a communication method according to an embodiment of the present disclosure.

FIG. 2 is a signaling interaction diagram of a communication method according to an embodiment of the present disclosure. This embodiment relates to a process of how a first network device and a second network device interact. As shown in FIG. 2, the method includes:

S201, a first network device sends a handover request to a second network device, where the handover request is used for handing over a terminal device from the first network device to the second network device, and the handover request includes a TA of the terminal device with the second network device.

The first network device may be a source network device before handover, and the second network device may be a target network device after handover.

In some embodiments, the handover request includes the TA of the terminal device with the second network device, and the TA of the terminal device with the second network device is reported to the first network device after the terminal device measures a network device of an adjacent cell, so that the second network device can know the TA of the terminal device with the second network device.

S202, the second network device schedules an uplink resource for the terminal device according to the TA of the terminal device with the second network device.

In this step, after the first network device sends a handover request to the second network device, the second network device schedules the uplink resource for the terminal device according to the TA of the terminal device with the second network device.

When scheduling the uplink resource for the terminal device, the second network device may schedule and output an uplink resource of which a transmission time is after the downlink reception time based on the TA of the terminal device with the second network device, so as to ensure the usability of the uplink resource for the terminal device.

This embodiment does not limit how to schedule an uplink resource for the terminal device, which can be carried out according to an existing scheduling manner of uplink resource.

In the communication method provided by the embodiment of the present disclosure, a first network device sends a handover request to a second network device, where the handover request is used for switching a target network device serving a terminal device from the first network device to the second network device, and the handover request includes a TA of the terminal device with the second network device. In this way, as the second network device after handover has determined the timing advance TA of the terminal device with the second network device, an uplink transmission time indicated by the network device can be prevented from being after a downlink reception time, and usability of uplink resource configuration is guaranteed.

Figure 3:
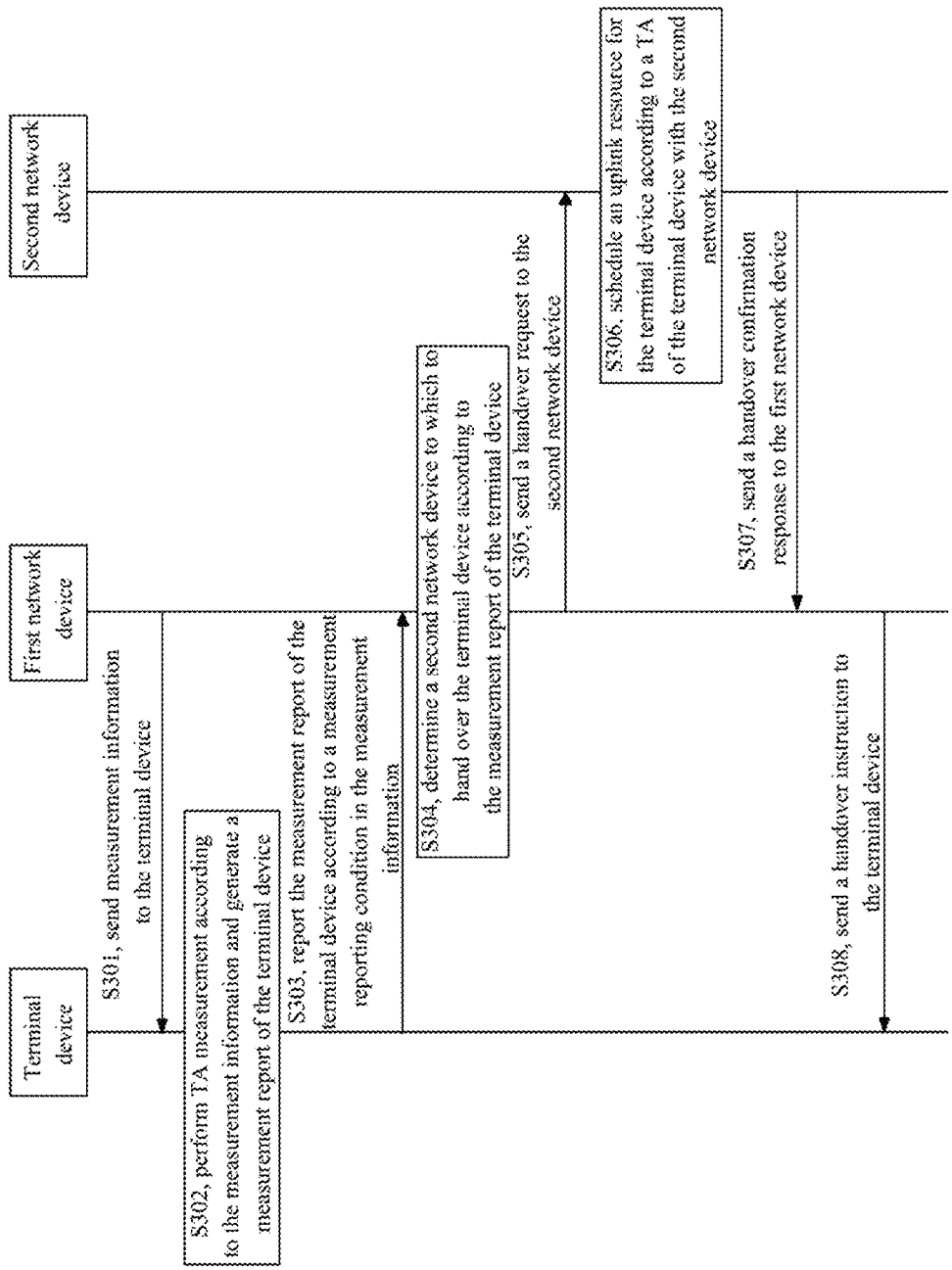
FIG. 3 is a signaling interaction diagram of another communication method according to an embodiment of the present disclosure.

On the basis of the above embodiments, the following describes an interaction process of the terminal device, the first network device, and the second network device. FIG. 3 is a signaling interaction diagram of another communication method according to an embodiment of the present disclosure. As shown in FIG. 3, the method includes:

S301, a first network device sends measurement information to a terminal device, where the measurement information is used for requesting the terminal device to perform TA measurement.

In some embodiments, the measurement information includes a measurement object and a measurement reporting condition. The embodiment of the present disclosure does not limit the measurement object and measurement reporting condition. Illustratively, the measurement object may be a network device of a serving cell and a network device adjacent to the serving cell. The measurement reporting condition includes at least one measurement event for handover.

S302, the terminal device performs TA measurement according to the measurement information and generates a measurement report of the terminal device, where the measurement report includes a TA of the terminal device with a second network device.

In this step, after the first network device sends the measurement information to the terminal device, the terminal device may perform TA measurement according to the measurement information, and generate a measurement report of the terminal device.

Illustratively, the terminal device acquires a serving cell to be measured from the measurement object in the measurement information sent by the first network device, so as to measure the TA of the terminal device with the network device corresponding to each serving cell in turn, and the measurement result includes the TA of the terminal device with a second network device, to which the terminal device is to be handed over. Subsequently, the terminal device generates the measurement report based on the TA of the terminal device with the network device corresponding to each serving cell.

The embodiment of the present disclosure does not limit when to perform measurement. In an implementation, the first network device sends activation information to the terminal device, where the activation information is used for activating the terminal device to perform the TA measurement according to the measurement information and generate the measurement report of the terminal device. Specifically, the first network device may send activation information to the terminal device by radio resource control (RRC) to activate the TA measurement in the measurement information.

In another implementation, after receiving the measurement information, the terminal device directly performs TA measurement by default, and does not need network signaling to explicitly indicate activation of the TA measurement.

S303, the terminal device reports the measurement report of the terminal device according to a measurement reporting condition in the measurement information.

In this step, after the terminal device determines the measurement report of the terminal device according to the measurement information, it may report the measurement report of the terminal device according to the measurement reporting condition in the measurement information.

Illustratively, if there exists at least one adjacent cell of which a network device satisfies a reporting condition of a measurement event for handover, the terminal device performs measurement reporting to the first network device. The embodiment of the present disclosure does not limit the measurement reporting condition, which may be specifically set according to an actual situation.

S304, the first network device determines a second network device to which to hand over the terminal device according to the measurement report of the terminal device.

In this step, after the terminal device reports the measurement report of the terminal device according to the measurement reporting condition, the first network device determines the second network device to which to hand over the terminal device according to the measurement report of the terminal device.

In this embodiment of the present disclosure, how to determine the second network device to which to hand over the terminal device may be specifically set according to the actual situation.

S305, the first network device sends a handover request to the second network device, where the handover request is used for handing over the terminal device from the first network device to the second network device, and the handover request includes a TA of the terminal device with the second network device.

S306, the second network device schedules an uplink resource for the terminal device according to the TA of the terminal device with the second network device.

The technical terms, technical effects, technical features, and implementations of S305-S306 can be understood with reference to S201-S202 shown in FIG. 2, and repeated content will not be repeated here.

S307, the second network device sends a handover confirmation response to the first network device, where the handover confirmation response includes a handover instruction, and the handover instruction is used for indicating that the terminal device is to be handed over from the first network device to the second network device.

In this step, after receiving the handover request sent by the first network device, the second network device may further send a handover confirmation response to the first network device.

The handover instruction in the handover confirmation response may include RACH-skip information. The RACH-skip information includes the uplink resource for the terminal device, or the RACH-skip information may not include the uplink resource for the terminal device and the uplink resource for the terminal device is dynamically indicated by the second network device.

S308, the first network device sends the handover instruction to the terminal device.

In this step, after receiving the handover confirmation response sent by the second network device, the first network device sends the handover instruction to the terminal device. After receiving the handover instruction, the terminal device may perform network device switching.

In some embodiments, the handover instruction includes the uplink resource for the terminal device.

Illustratively, after receiving the handover instruction, if the RACH-skip information included in the handover instruction includes a configured uplink resource, the terminal device uses the uplink to transmit resource an RRCReconfigurationComplete message.

In some embodiments, the handover instruction does not include the uplink resource for the terminal device. Then, the second network device indicates the uplink resource for the terminal device to the terminal device by a physical downlink control channel. The terminal device monitors the physical downlink control channel of the second network device, and receives the uplink resource for the terminal device indicated by the second network device.

Illustratively, if the first network device does not include the configured uplink resource in the RACH-skip information included in the sent handover instruction, the second network device allocates an uplink transmission resource for the terminal device by using a method of dynamic scheduling, and indicates to the terminal device by a PDCCH. The terminal device monitors a PDCCH scrambled by a cell-radio network temporary identifier (C-RNTI), and if a PDCCH that dynamically schedules uplink transmission is detected, an RRCReconfigurationComplete message is transmitted using the dynamically scheduled uplink resource.

The second network device considers the TA of the terminal device with the second network device reported by the terminal device when allocating the dynamically scheduled uplink resource to the terminal device. Illustratively, a value of k2 indicated in downlink control information (downlink control information, DCI) is not less than the TA reported by the terminal device, so as to ensure the usability of the dynamically scheduled uplink resource.

The communication method provided by the embodiment of the present disclosure, a first network device sends a handover request to a second network device, where the handover request is used for switching a target network device serving a terminal device from the first network device to the second network device, and the handover request includes a TA of the terminal device with the second network device. In this way, as the second network device after handover has determined the timing advance TA of the terminal device with the second network device, an uplink transmission time of the uplink resource indicated by the network device can be prevented from being after a downlink reception time, and usability of uplink resource configuration is guaranteed.

A second manner to ensure the usability of uplink resource configuration provided by the present disclosure will be described below. In the second manner, a first network device sends location information of a terminal device and a movement trajectory of the terminal device measured by the terminal device to a second terminal device, so that the second network device determines a TA of the terminal device with the second network device according to the location information of the terminal device and the movement trajectory of the terminal device, and the second network device configures an uplink resource for the terminal device according to the TA of the terminal device with the second network device.

Figure 4:
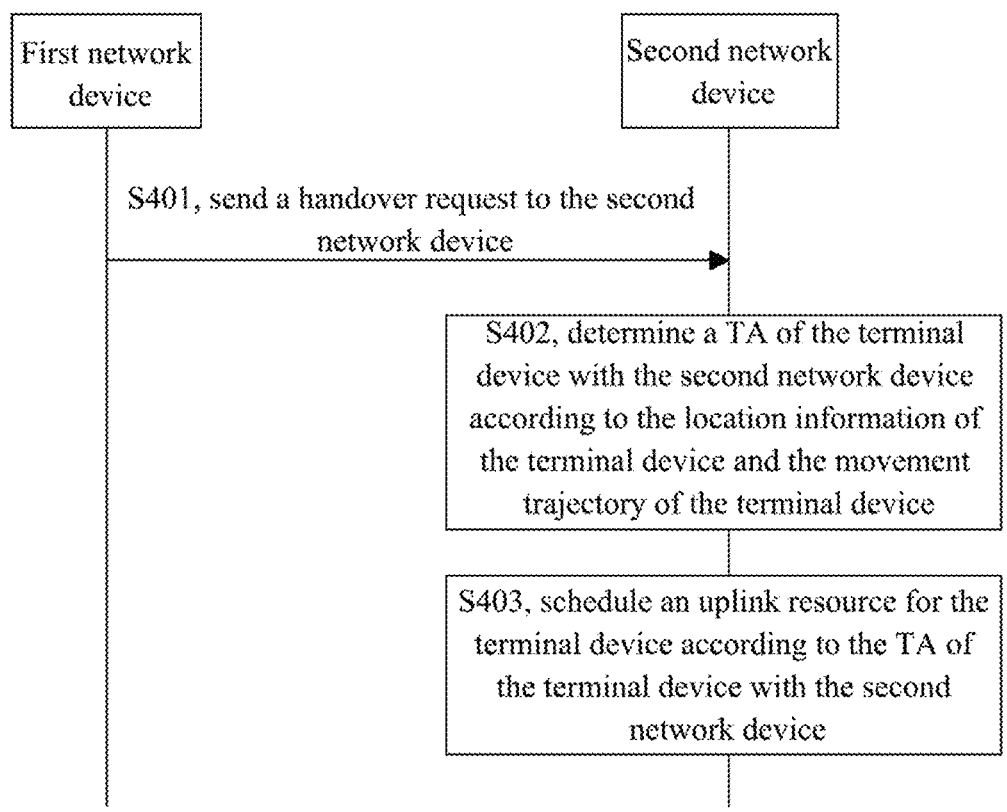
FIG. 4 is a signaling interaction diagram of still another communication method according to an embodiment of the present disclosure.

FIG. 4 is a signaling interaction diagram of still another communication method according to an embodiment of the present disclosure. This embodiment relates to a process of how a first network device and a second network device interact. As shown in FIG. 4, the method includes:

S401, a first network device sends a handover request to a second network device, where the handover request is used for handing over a terminal device from the first network device to the second network device, and the handover request includes location information of the terminal device and a movement trajectory of the terminal device.

The first network device may be a source network device before handover, and the second network device may be a target network device after handover.

In some embodiments, the handover request includes the location information of the terminal device and the movement trajectory of the terminal device. The location information of the terminal device and the movement trajectory of the terminal device are measured by the terminal device and then reported to the first network device, so that the second network device can determine the TA of the terminal device with the second network device based on the location information of the terminal device and the movement trajectory of the terminal device.

In some embodiments, the location information includes a timestamp of when the terminal device is at the location.

In some embodiments, the movement trajectory includes a movement direction of the terminal device, a movement speed of the terminal device and an acceleration of the terminal device.

S402, the second network device determines a TA of the terminal device with the second network device according to the location information of the terminal device and the movement trajectory of the terminal device.

In this step, after receiving the location information of the terminal device and the movement trajectory of the terminal device sent by the first network device, the second network device can determine the TA of the terminal device with the second network device according to the location information of the terminal device and the movement trajectory of the terminal device.

The embodiment of the present disclosure does not limit how to determine the TA of the terminal device with the second network device. Illustratively, the second network device may determine the TA of the terminal device with the second network device based on the location information and movement trajectory reported by the terminal device in combination with a location of a satellite where the second network device is located.

S403, the second network device schedules an uplink resource for the terminal device according to the TA of the terminal device with the second network device.

The technical terms, technical effects, technical features, and implementations of S403 can be understood with reference to S202 shown in FIG. 2, and repeated content will not be repeated here.

In the communication method provided by the embodiment of the present disclosure, a first network device sends a handover request to a second network device, where the handover request is used for handing over a terminal device from the first network device to the second network device, and the handover request includes location information of the terminal device and a movement trajectory of the terminal device, and the second network device determines a TA of the terminal device with the second network device according to the location information of the terminal device and the movement trajectory of the terminal device. Subsequently, the second network device schedules an uplink resource for the terminal device according to the TA of the terminal device with the second network device. In this way, as the second network device after handover has determined the timing advance TA of the terminal device with the second network device, an uplink transmission time of the uplink resource indicated by the network device can be prevented from being before a downlink reception time, and usability of uplink resource configuration is guaranteed.

Figure 5:
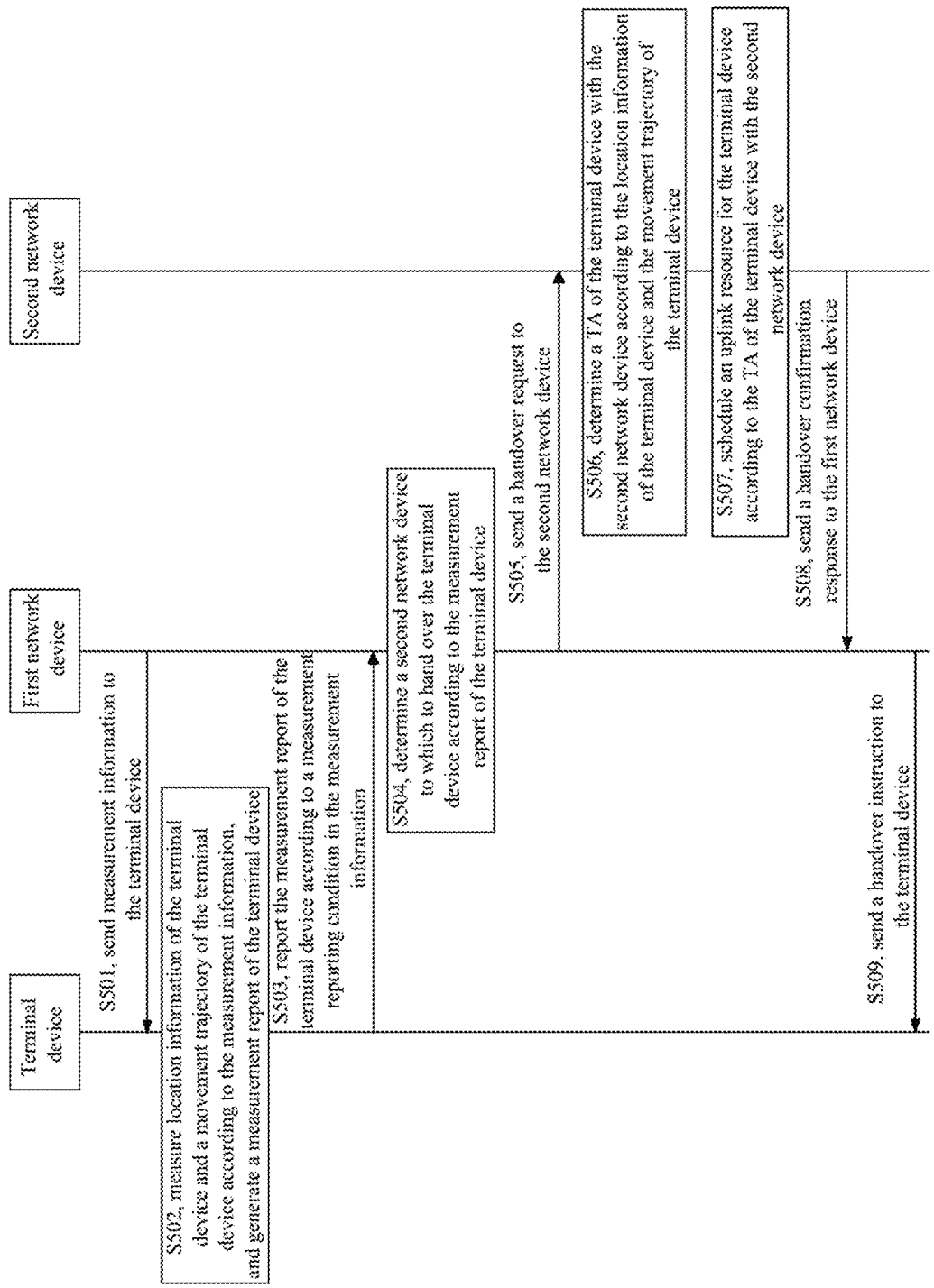
FIG. 5 is a signaling interaction diagram of further another communication method according to an embodiment of the present disclosure.

On the basis of the above embodiments, an interaction process of the terminal device, the first network device, and the second network device is described in the following. FIG. 5 is a signaling interaction diagram of further another communication method according to an embodiment of the present disclosure. As shown in FIG. 5, the method includes:

S501, a first network device sends measurement information to a terminal device, where the measurement information is used for requesting the terminal device to measure location information of the terminal device and a movement trajectory of the terminal device.

In some embodiments, the measurement information includes a measurement object and a measurement reporting condition. The embodiment of the present disclosure does not limit the measurement object and measurement reporting condition. Illustratively, the measurement object may be a network device of a serving cell and a network device adjacent to the serving cell. The measurement reporting condition includes at least one measurement event for handover.

S502, the terminal device measures the location information of the terminal device and the movement trajectory of the terminal device according to the measurement information, and generates a measurement report of the terminal device.

In this step, after the first network device sends the measurement information to the terminal device, the terminal device may measure the location information of the terminal device and the movement trajectory of the terminal device according to the measurement information, and generate the measurement report of the terminal device.

The embodiment of the present disclosure does not limit how to measure the location information and movement trajectory of the terminal device. In an implementation, the location information and movement trajectory of the terminal device may be measured based on positioning software in the terminal device.

The embodiment of the present disclosure does not limit when to perform measurement. In an implementation, the first network device sends activation information to the terminal device, where the activation information is used for activating the terminal device to measure the location information of the terminal device and the movement trajectory of the terminal device according to the measurement information, and generate the measurement report of the terminal device. Specifically, the first network device may send the activation information to the terminal device by radio resource control (RRC).

In another implementation, after receiving the measurement information, the terminal device directly performs the measurement of the location information of the terminal device and the movement trajectory of the terminal device by default, and does not need network signaling to explicitly indicate activation.

S503, the terminal device reports the measurement report of the terminal device according to a measurement reporting condition in the measurement information.

In this step, after the terminal device determines the measurement report of the terminal device according to the measurement information, it may report the measurement report of the terminal device according to the measurement reporting condition in the measurement information.

Illustratively, if there exists at least one adjacent cell of which a network device satisfies a reporting condition of a measurement event for handover, the terminal device performs measurement reporting to the first network device. The embodiment of the present disclosure does not limit the measurement reporting condition, which may be specifically set according to an actual situation.

It should be noted that the embodiment of the present disclosure further provides other ways to report the location of the terminal device and the movement trajectory of the terminal device. Illustratively, the first network device may configure the terminal device to perform auxiliary information reporting for the location information and the movement trajectory, and the terminal device may report the location and movement trajectory of the terminal device through a UE assistance information message. Illustratively, the first network device sends a reporting request to the terminal device, and the terminal device reports the location and movement trajectory of the terminal device based on a network's request.

S504, the first network device determines a second network device to which to hand over the terminal device according to the measurement report of the terminal device.

In this step, after the terminal device reports the measurement report of the terminal device according to the measurement reporting condition, the first network device determines the second network device to which to hand over the terminal device according to the measurement report of the terminal device.

The embodiment of the present disclosure does not limit how to determine the second network device to which to hand over the terminal device, which can be specifically set according to an actual condition. Illustratively, a network device corresponding to a serving cell closest to the terminal device may be determined according to the location information and movement trajectory of the terminal, and it can be taken as the second network device.

S505, the first network device sends a handover request to the second network device, where the handover request is used for handing over the terminal device from the first network device to the second network device, and the handover request includes the location information of the terminal device and the movement trajectory of the terminal device.

S506, the second network device determines a TA of the terminal device with the second network device according to the location information of the terminal device and the movement trajectory of the terminal device.

S507, the second network device schedules an uplink resource for the terminal device according to the TA of the terminal device with the second network device.

The technical terms, technical effects, technical features, and implementations of S505-S507 can be understood with reference to S401-S403 shown in FIG. 4, and repeated content will not be repeated here.

S508, the second network device sends a handover confirmation response to the first network device, where the handover confirmation response includes a handover instruction, and the handover instruction is used for indicating that the terminal device is to be handed over from the first network device to the second network device.

S509, the first network device sends the handover instruction to the terminal device.

The technical terms, technical effects, technical features, and implementations of S508-S509 can be understood with reference to S307-S308 shown in FIG. 3, and repeated content will not be repeated here.

The communication method provided by the embodiment of the present disclosure, a first network device sends a handover request to a second network device, where the handover request is used for handing over a terminal device from the first network device to the second network device, and the handover request includes location information of the terminal device and a movement trajectory of the terminal device, and the second network device determines a TA of the terminal device with the second network device according to the location information of the terminal device and the movement trajectory of the terminal device. Subsequently, the second network device schedules an uplink resource for the terminal device according to the TA of the terminal device with the second network device. In this way, as the second network device after handover has determined the timing advance TA of the terminal device with the second network device, an uplink transmission time of the uplink resource indicated by the network device can be prevented from being before a downlink reception time, and usability of uplink resource configuration is guaranteed.

Those of ordinary skill in the art can understand that: all or part of the steps for implementing the above method embodiments can be completed by hardware related to program information, the aforementioned program may be stored in a computer-readable storage medium, and when the program is executed, the steps including the above method embodiments are executed; and the aforementioned storage medium includes: a ROM, a RAM, a magnetic disk or an optical disk and other media that can store program code.

Figure 6:
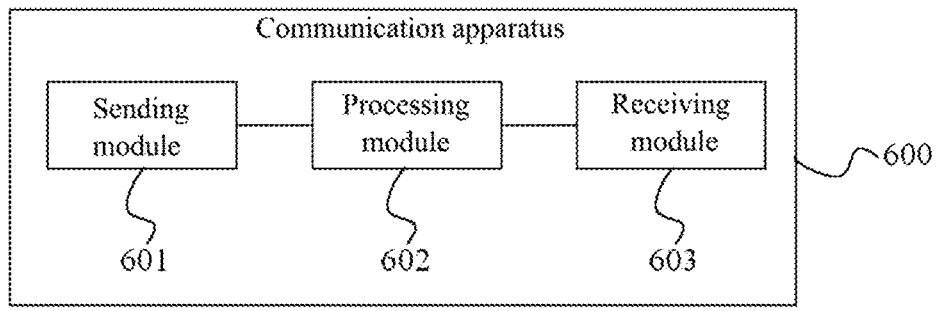
FIG. 6 is a schematic structural diagram of a communication apparatus according to an embodiment of the present disclosure.

FIG. 6 is a schematic structural diagram of a communication apparatus according to an embodiment of the present disclosure. The communication apparatus may be implemented by software, hardware, or a combination of the two, so as to execute the above communication method on the first network device side in FIG. 2 or FIG. 3. As shown in FIG. 6, a communication apparatus 600 includes: a sending module 601, a processing module 602 and a receiving module 603.

The sending module is configured to send a handover request to a second network device, where the handover request is used for handing over a terminal device from the first network device to the second network device, and the handover request includes a TA of the terminal device with the second network device.

In an implementation, the apparatus further includes: a receiving module;
the sending module is further configured to send measurement information to the terminal device, where the measurement information is used for requesting the terminal device to perform TA measurement; and
the receiving module is configured to receive a measurement report sent by the terminal device, where the measurement report includes the TA of the terminal device with the second network device.

In an implementation, the sending module is further configured to send activation information to the terminal device, where the activation information is used for activating the terminal device to perform the TA measurement according to the measurement information and generate the measurement report of the terminal device.

In an implementation, the apparatus further includes: a processing module, configured to determine the second network device to which be hand over the terminal device according to the measurement report of the terminal device.

In an implementation, the receiving module is further configured to receive a handover confirmation response sent by the second network device, where the handover confirmation response includes a handover instruction, and the handover instruction is used for indicating that the terminal device is to be handed over from the communication apparatus to the second network device; and the sending module is further configured to send the handover instruction to the terminal device.

In an implementation, the handover instruction includes an uplink resource for the terminal device.

The communication apparatus provided in this embodiment of the present disclosure can perform the actions of the communication method on the first network device side in the method embodiment of FIG. 2 or FIG. 3, and the implementation principle and technical effect thereof are similar, and are not repeated here.

Figure 7:
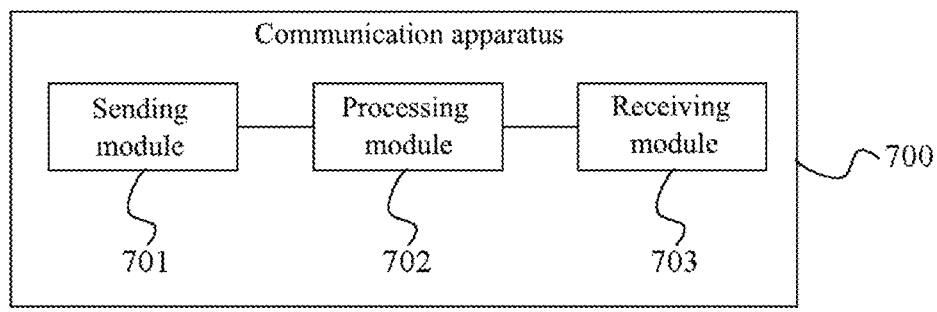
FIG. 7 is a schematic structural diagram of another communication apparatus according to an embodiment of the present disclosure.

FIG. 7 is a schematic structural diagram of another communication apparatus according to an embodiment of the present disclosure. The communication apparatus may be implemented by software, hardware, or a combination of the two, so as to execute the above communication method on the second network device side in FIG. 2 or FIG. 3. As shown in FIG. 7, a communication apparatus 700 includes: a sending module 701, a processing module 702 and a receiving module 703.

The receiving module is configured to receive a handover request sent by a first network device, where the handover request is used for handing over a terminal device from the first network device to the communication apparatus, and the handover request includes a TA of the terminal device with the communication apparatus; and
the processing module is configured to schedule an uplink resource for the terminal device according to the TA of the terminal device with the communication apparatus.

In an implementation, the apparatus further includes: a sending module, configured to send a handover confirmation response to the first network device, where the handover confirmation response includes a handover instruction, and the handover instruction is used for indicating that the terminal device is to be handed over from the first network device to the communication apparatus.

In an implementation, the handover instruction includes an uplink resource for the terminal device.

In an implementation, the sending module is further configured to indicate an uplink resource for the terminal device to the terminal device by a physical downlink control channel.

The communication apparatus provided in this embodiment of the present disclosure can perform the actions of the communication method on the second network device side in the method embodiment of FIG. 2 or FIG. 3, and the implementation principle and technical effect thereof are similar, and are not repeated here.

Figure 8:
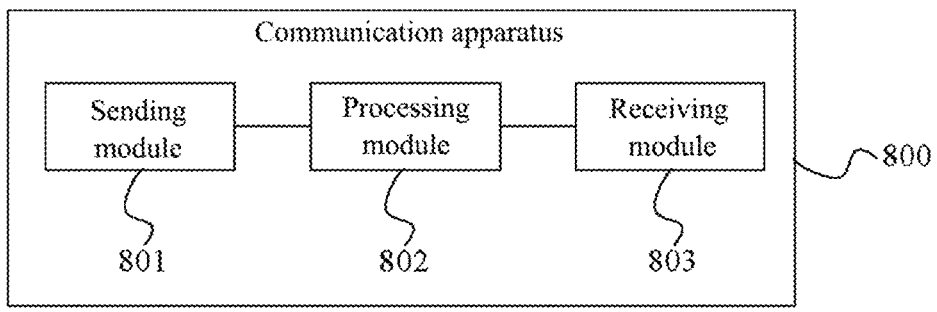
FIG. 8 is a schematic structural diagram of still another communication apparatus according to an embodiment of the present disclosure.

FIG. 8 is a schematic structural diagram of still another communication apparatus according to an embodiment of the present disclosure. The communication apparatus may be implemented by software, hardware, or a combination of the two, so as to execute the above communication method on the terminal side in FIG. 2 or FIG. 3. As shown in FIG. 8, a communication apparatus 800 includes: a sending module 801, a processing module 802 and a receiving module 803.

The receiving module 803 is configured to receive a handover instruction sent by a first network device, where the handover instruction is used for indicating that the terminal device is to be handed over from the first network device to a second network device.

In an implementation, the apparatus further includes: a processing module 802;
the receiving module 803 is further configured to receive measurement information sent by the first network device; and
the processing module 802 is further configured to perform TA measurement according to the measurement information and generate a measurement report of the terminal device; where the measurement report includes a TA of the terminal device with the second network device.

In an implementation, the receiving module is further configured to receive activation information sent by the first network device, where the activation information is used for activating the terminal device to perform the TA measurement according to the measurement information and generate the measurement report of the terminal device.

In an implementation, the apparatus further includes: a sending module 801, configured to report the measurement report of the terminal device according to a measurement reporting condition in the measurement information.

In an implementation, the handover instruction includes an uplink resource for the terminal device.

In an implementation, the receiving module 803 is further configured to monitor a physical downlink control channel of the second network device and receive an uplink resource for the terminal device indicated by the second network device.

The communication apparatus provided in this embodiment of the present disclosure can perform the actions of the communication method on the terminal device side in the method embodiment of FIG. 2 or FIG. 3, and the implementation principle and technical effect thereof are similar, and are not repeated here.

Figure 9:
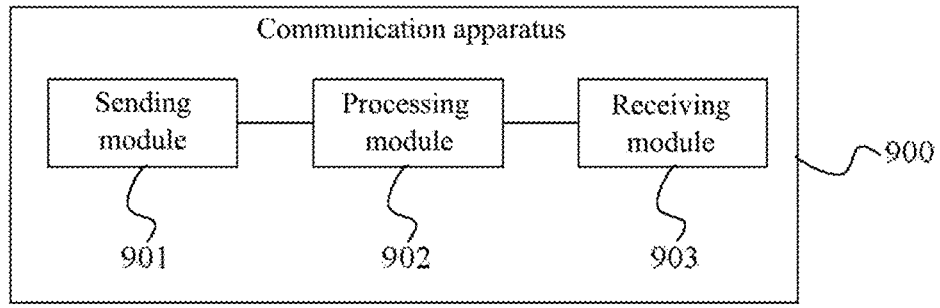
FIG. 9 is a schematic structural diagram of further another communication apparatus according to an embodiment of the present disclosure.

FIG. 9 is a schematic structural diagram of further another communication apparatus according to an embodiment of the present disclosure. The communication apparatus may be implemented by software, hardware, or a combination of the two, so as to execute the above communication method on the first network device side in FIG. 4 or FIG. 5. As shown in FIG. 9, a communication apparatus 900 includes: a sending module 901, a processing module 902 and a receiving module 903.

The sending module 901 is configured to send a handover request to a second network device, where the handover request is used for handing over a terminal device from the communication apparatus to the second network device, and the handover request includes location information of the terminal device and a movement trajectory of the terminal device, and the location information of the terminal device and the movement trajectory of the terminal device are used for determining a TA of the terminal device with the second network device.

In an implementation, the apparatus further includes: a receiving module 903;
the sending module 901 is further configured to send measurement information to the terminal device, where the measurement information is used for requesting the terminal device to measure the location information of the terminal device and the movement trajectory of the terminal device; and
the receiving module 903 is configured to receive a measurement report sent by the terminal device, where the measurement report includes the location information of the terminal device and the movement trajectory of the terminal device.

In an implementation, the location information includes a timestamp of when the terminal device is at the location.

In an implementation, the movement trajectory includes a movement direction of the terminal device, a movement speed of the terminal device and an acceleration of the terminal device.

In an implementation, the apparatus further includes: a processing module; and
the processing module 902 is configured to determine the second network device to which to hand over the terminal device according to the measurement report of the terminal device.

In an implementation, the receiving module 903 is further configured to receive a handover confirmation response sent by the second network device, where the handover confirmation response includes a handover instruction, and the handover instruction is used for indicating that the terminal device is to be handed over from the communication apparatus to the second network device; and
the sending module 901 is further configured to send the handover instruction to the terminal device.

In an implementation, the handover instruction includes an uplink resource for the terminal device.

The communication apparatus provided in this embodiment of the present disclosure can perform the actions of the communication method on the first network device side in the method embodiment of FIG. 4 or FIG. 5, and the implementation principle and technical effect thereof are similar, and are not repeated here.

Figure 10:
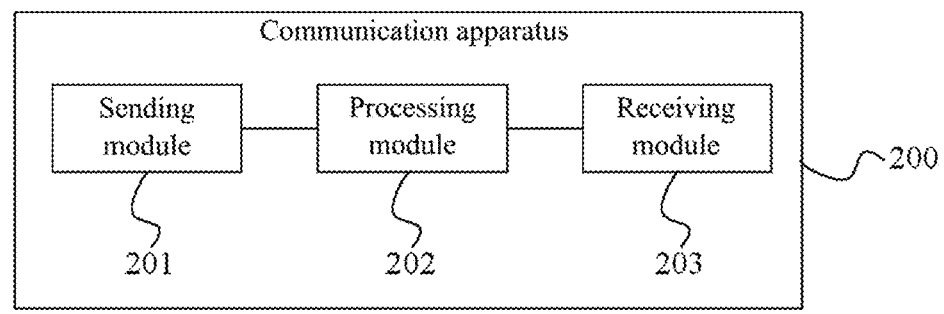
FIG. 10 is a schematic structural diagram of further another communication apparatus according to an embodiment of the present disclosure.

FIG. 10 is a schematic structural diagram of further another communication apparatus according to an embodiment of the present disclosure. The communication apparatus may be implemented by software, hardware, or a combination of the two, so as to execute the above communication method on the second network device side in FIG. 4 or FIG. 5. As shown in FIG. 10, a communication apparatus 200 includes: a sending module 201, a processing module 202 and a receiving module 203.

The receiving module 203 is configured to receive a handover request sent by a first network device, where the handover request is used for handing over a terminal device from the first network device to the communication apparatus, and the handover request includes location information of the terminal device and a movement trajectory of the terminal device; and the processing module 202 is configured to determine a TA of the terminal device with the communication apparatus according to the location information of the terminal device and the movement trajectory of the terminal device; and schedule an uplink resource for the terminal device according to the TA of the terminal device with the communication apparatus.

In an implementation, the location information includes a timestamp of when the terminal device is at the location.

In an implementation, the movement trajectory includes a movement direction of the terminal device, a movement speed of the terminal device and an acceleration of the terminal device.

In an implementation, the apparatus further includes:

a sending module 201, configured to send a handover confirmation response to the first network device, where the handover confirmation response includes a handover instruction, and the handover instruction is used for indicating that the terminal device is to be handed over from the first network device to the communication apparatus.

In an implementation, the handover instruction includes an uplink resource for the terminal device.

In an implementation, the sending module is further configured to indicate the uplink resource for the terminal device to the terminal device by a physical downlink control channel.

The communication apparatus provided in this embodiment of the present disclosure can perform the actions of the communication method on the second network device side in the method embodiment of FIG. 4 or FIG. 5, and the implementation principle and technical effect thereof are similar, and are not repeated here.

Figure 11:
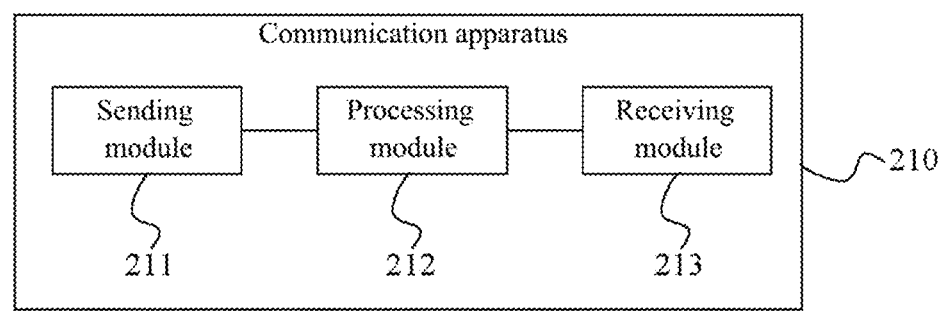
FIG. 11 is a schematic structural diagram of further another communication apparatus according to an embodiment of the present disclosure.

FIG. 11 is a schematic structural diagram of further another communication apparatus according to an embodiment of the present disclosure. The communication apparatus may be implemented by software, hardware, or a combination of the two, so as to execute the above communication method on the terminal device side in FIG. 4 or FIG. 5. As shown in FIG. 11, a communication apparatus 210 includes: a sending module 211, a processing module 212 and a receiving module 213.

The receiving module 213 is configured to receive a handover instruction sent by a first network device, where the handover instruction is used for indicating that the terminal device is to be handed over from the first network device to a second network device.

In an implementation, the apparatus further includes: a processing module 212;

the receiving module 213 is further configured to receive measurement information sent by the first network device; and the processing module 212 is configured to measure location information of the terminal device and a movement trajectory of the terminal device according to the measurement information, and generate a measurement report of the terminal device.

In an implementation, the location information includes a timestamp of when the terminal device is at the location.

In an implementation, the movement trajectory includes a movement direction of the terminal device, a movement speed of the terminal device and an acceleration of the terminal device.

In an implementation, the apparatus further includes:

the sending module 211, configured to report the measurement report of the terminal device according to a measurement reporting condition in the measurement information.

In an implementation, the handover instruction includes an uplink resource for the terminal device.

In an implementation, the receiving module is further configured to monitor a physical downlink control channel of the second network device and receive an uplink resource for the terminal device indicated by the second network device.

The communication apparatus provided in this embodiment of the present disclosure can perform the actions of the communication method on the terminal device side in the method embodiment of FIG. 4 or FIG. 5, and the implementation principle and technical effect thereof are similar, and are not repeated here.

Figure 12:
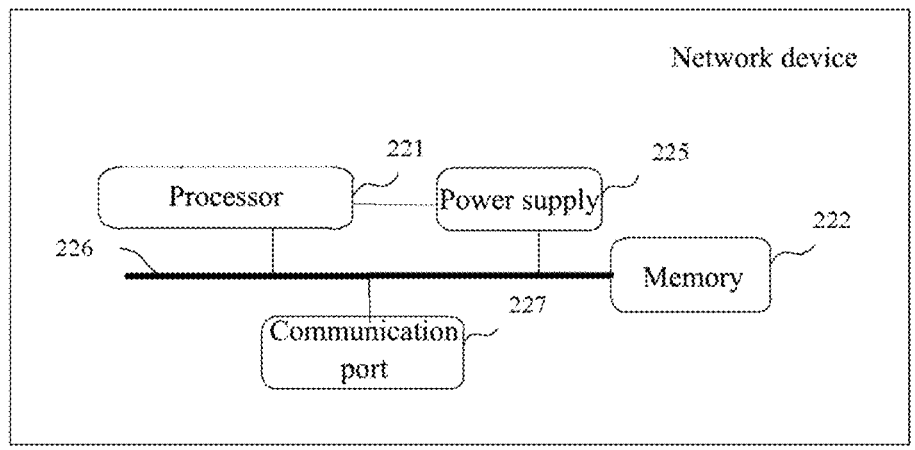
FIG. 12 is a schematic structural diagram of a network device according to an embodiment of the present disclosure.

FIG. 12 is a schematic structural diagram of a network device according to an embodiment of the present disclosure. As shown in FIG. 12, the access network device may include: a processor 221 (for example, a CPU) and a memory 222; the memory 222 may include a high-speed RAM memory, and may further include a non-volatile memory NVM, such as at least one disk memory, various information may be stored in the memory 222 for completing various processing functions and implementing the method steps of the first network device provided by the embodiments of the present disclosure, or, for completing various processing functions and implementing the method steps of the second network device provided by the embodiments of the present disclosure. The network device involved in the embodiment of the present disclosure may further include: a power supply 225, a communication bus 226, and a communication port 227. The communication bus 226 is configured to implement a communication connection between elements. The above communication port 227 is configured to implement a connection and communication between the network device and other peripheral devices.

In the embodiment of the present disclosure, the above memory 222 is configured to store computer-executable program code, and the program code includes information; when the processor 221 executes the information, the information causes the processor 221 to execute a processing action of the first network device in the above method embodiments, or, execute a processing action of the second network device in the above method embodiments, and the implementation principle and technical effect thereof are similar, and are not repeated here.

Figure 13:
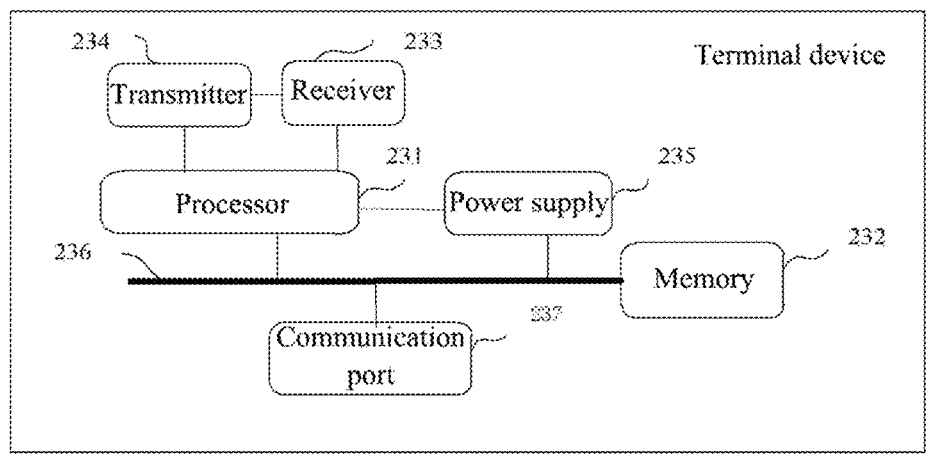
FIG. 13 is a schematic structural diagram of a terminal device according to an embodiment of the present disclosure.

FIG. 13 is a schematic structural diagram of a terminal device according to an embodiment of the present disclosure. As shown in FIG. 13, a terminal device may include: a processor 231 (for example, a CPU) and a memory 232; a receiver 233, and a transmitter 234; the receiver 233 and the transmitter 234 are coupled to the processor 231, which controls a receiving action of the receiver 233 and a sending action of the transmitter 234. The memory 232 may include a high-speed RAM memory, and may further include a non-volatile memory NVM, such as at least one disk memory, and various information may be stored in the memory 232 for completing various processing functions and implementing the method steps of the embodiments of the present disclosure. The terminal device involved in the embodiment of the present disclosure may further include: a power supply 235, a communication bus 236, and a communication port 237. The receiver 233 and the transmitter 234 may be integrated in a transceiver of the terminal device, or may be independent transceiver antennas on the terminal device. The communication bus 236 is configured to implement a communication connection between elements. The above communication port 237 is configured to implement a connection and communication between the terminal device and other peripheral devices.

In the embodiment of the present disclosure, the above memory 232 is configured to store computer-executable program code, and the program code includes information; when the processor 231 executes the information, the information causes the processor 231 to execute a processing action of the terminal device in the above method embodiments, causes the transmitter 234 to execute a sending action of the terminal device in the above method embodiments, and causes the receiver 233 to execute a receiving action of the terminal device in the above method embodiments, and the implementation principle and technical effect thereof are similar, and are not repeated here.

An embodiment of the present disclosure further provides a communication system, including a terminal device, a first network device, and a second network device. The terminal device executes the above communication method on the terminal device side, the first network device executes the above communication method on the first network device side, and the second network device executes the above communication method on the second network device side.

An embodiment of the present disclosure further provides a chip, including a processor and an interface. The interface is configured to input and output data or instructions processed by the processor. The processor is configured to execute the methods provided in the above method embodiments. The chip can be applied to a terminal device, a first network device, or a second network device.

The present disclosure further provides a computer-readable storage medium, the computer-readable storage medium may include: a U disk, a mobile hard disk, a read-only memory (ROM), a random access memory (RAM), a magnetic disk or an optical disk or other media that can store program code, specifically, the computer-readable storage medium stores program information, and the program information is used for the above communication method on the terminal device side, or for the above communication method on the first network device side, or for the above communication method on the second network device side.

An embodiment of the present disclosure further provides a program, which, when executed by a processor, is configured to execute the communication method on the terminal device side, or the communication method on the first network device side, or the second network device side communication method provided by the above method embodiments.

An embodiment of the present disclosure further provides a program product, such as a computer-readable storage medium, the program product has instructions stored therein, and the instructions, when run on a computer, cause the computer to execute the communication method on the terminal device side, or the communication method on the first network device side, or the second network device side communication method provided by the above method embodiments.

In the above embodiments, it is possible to implement in whole or in part by software, hardware, firmware or any combination thereof. When implemented in software, it is possible to implement in whole or in part in a form of a computer program product. A computer program product includes one or more computer instructions. When the computer program instruction(s) is loaded and executed on the computer, the flow or function according to the embodiments of the present disclosure is generated in whole or in part. The computer may be a general-purpose computer, a special-purpose computer, a computer network, or other programmable apparatus. Computer instructions may be stored in a computer-readable storage medium or transmitted from one computer-readable storage medium to another. For example, computer instructions may be transmitted from one website site, computer, server or data center to another website site, computer, server or data center in a wired (such as coaxial cable, optical fiber, digital subscriber line (DSL)) or wireless (such as infrared, wireless, microwave, etc.) manner. The computer-readable storage medium may be any available medium that can be accessed by the computer, or a data storage device, such as a server and a data center, integrated with one or more available media. The available medium may be a magnetic medium (e.g., a floppy disk, a hard disk, a magnetic tape), an optical medium (e.g., a DVD), or a semiconductor medium (e.g., a solid state disk (SSD)), etc.

Finally, it should be noted that the above embodiments are only used to illustrate the technical solutions of the present disclosure, but not to limit them; although the present disclosure has been described in detail with reference to the foregoing embodiments, those of ordinary skill in the art should understand that: they can still modify the technical solutions recorded in the above embodiments, or make equivalent substitution for some or all of the technical features. However, these modifications or substitutions do not make the essence of the corresponding technical solutions deviate from the scope of the technical solutions of the embodiments of the present disclosure.

What is claimed is:

1. A communication method, comprising:
sending, by a first network device, a handover request to a second network device, wherein the handover request is used for handing over a terminal device from the first network device to the second network device, and the handover request comprises location information of the terminal device and a movement trajectory of the terminal device, and the location information of the terminal device and the movement trajectory of the terminal device are used for determining a timing advance (TA) of the terminal device with the second network device.

2. The method according to claim 1, wherein the method further comprises:
sending, by the first network device, measurement information to the terminal device, wherein the measurement information is used for requesting the terminal device to measure the location information of the terminal device and the movement trajectory of the terminal device; and
receiving, by the first network device, a measurement report sent by the terminal device, wherein the measurement report comprises the location information of the terminal device and the movement trajectory of the terminal device.

3. The method according to claim 2, wherein the location information comprises a timestamp obtained when the terminal device is at a location.

4. The method according to claim 2, wherein the movement trajectory comprises a movement direction of the terminal device, a movement speed of the terminal device and an acceleration of the terminal device.

5. The method according to claim 2, wherein the method further comprises:

determining, by the first network device, the second network device to which to hand over the terminal device according to the measurement report of the terminal device.

6. The method according to claim 1, wherein the method further comprises:

receiving, by the first network device, a handover confirmation response sent by the second network device, wherein the handover confirmation response comprises a handover instruction, and the handover instruction is used for indicating that the terminal device is to be handed over from the first network device to the second network device; and sending, by the first network device, the handover instruction to the terminal device.

7. The method according to claim 6, wherein the handover instruction comprises an uplink resource for the terminal device.

* * * * *